United States Patent Office 3,009,9:
Patented Nov. 21, 19

3,009,932
6-FLUORO-9α,11β,21-TRIHALO-PROGESTERONES
Hans Reimann, Bloomfield, and David H. Gould, Leonia, N.J., assignors to Schering Corporation, Bloomfield, N.J., a corporation of New Jersey
No Drawing. Filed June 1, 1959, Ser. No. 817,055
20 Claims. (Cl. 260—397.3)

This invention relates to novel and therapeutically useful halogenated steroids and to methods for their manufacture. In particular, this invention relates to 6,17,21-trisubstituted-9α,11β-dihalogenated derivatives of progesterone which exhibit valuable progestational properties.

Our novel compounds may be represented by the following formula:

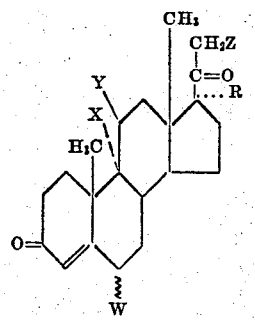

wherein X is a halogen having an atomic weight greater than 19; Y is a halogen having an atomic weight less than 126 and being at least as electro-negative as X; R is a member of the group consisting of bromine, hydroxy, and acyloxy; W is a member of the group consisting of fluorine; Z is halogen preferably fluorine or iodine; and the 1-dehydro analogs thereof. The bond designated by the wavy line (∼) in the above formula indicates that the substituent at the 6-carbon may be in an α- or β-position. In this application whenever the configuration at 6 is not specifically designated as α or β, both configurations are included. These novel compounds are thus 6,9,11,17,21-pentahalogenated analogs, 17-hydroxy-, and 17-acyloxy-6,9,11,21-tetrahalogenated analogs, of progesterone and 1-dehydroprogesterone.

Illustrative of the 17α-acyl groups in the 17α-acyloxy derivatives contemplated by our invention are lower alkanoates such as formate, acetate, propionate, butyrate, isobutyrate, valerate, isovalerate, pivalate, caproate, enanthate; substituted alkanoates such as β-cyclopentylpropionate, cyclohexylacetate, ethoxyacetate, phenylacetate, phenoxyacetate; unsaturated acyl radicals such as acrylate and crotonate, aromatic acyl radicals such as benzoate and toluate, as well as the residues of dibasic acids such as succinate and phthalate and of fatty acids such as undecanoate and laurate. The term "lower alkanoate" thus includes acyl radicals of monocarboxylic and dicarboxylic acids containing up to 12 carbon atoms.

Typical progestins embraced by the general formula are the 6,21-difluoro-9α,11β-dichloro-17α-acetoxyprogesterones (i.e. both the 6α and 6β-isomers of 6,21-difluoro-9α,11β-dichloro-17α-hydroxyprogesterone 17-acetate), 6-fluoro - 9α,11β - dichloro - 21-iodo-17α-acetoxyprogesterones, 6α,11β,21 - trifluoro - 9α-bromo-17α-acetoxyprogesterone, 6α,21 - difluoro - 9α-iodo-11β-chloro-17α-acetoxyprogesterone, 6α,21-difluoro-9α,11β-dichloro-17α-bromoprogesterone, as well as their 1-dehydro analogs. Although our compounds (with the exception of the 17-hydroxy substituted compounds which are valuable as intermediates) are, in general, valuable progestins, the 6α-substituted-17α-acyloxy-21-fluoroprogesterones of the general formula are the preferred species and in particular, 6α,21-difluoro-9α,11β-dichloro-17α-hydroxyprogesterone 17-acetate.

In the above formula, the halogen at C–11 must at least as electronegative as the halogen present in 9α-position (fluorine being the most electronegative halogen, and iodine the least electronegative) and furtl cannot be iodo. Thus, a progesterone of our invent containing a 9α-chloro group may possess an 11β-chl( or an 11β-fluoro group, but cannot contain an 11β-ic or 11β-bromo group. This artificial restriction as to electronegativity of the 9- and 11-substituents is nec sarily imposed in view of the limitations of the ma facturing process developed below.

Our novel compounds are prepared by reacting a 4 (11)-pregnadiene-3,20-dione substituted at the 6-cart by fluorine, at the 17-carbon by hydroxy, acyloxy, ha gen, and at the 21-carbon preferably by fluorine iodine (or a similarly substituted 1,4,9(11)-pregnatrie 3,20-dione) with a suitable halogenating agent. 1 starting compounds utilized in this invention are theref( exemplified by compounds such as 6,21-difluoro-1' acetoxy - 4,9(11) - pregnadiene-3,20-diones, 6-fluoro-: iodo - 17α - acetoxy-4,9(11)-pregnadiene-3,20-diones, well as the unesterified 17α-hydroxy analogs of the fo going, 6,21-difluoro-17α-bromo-4,9(11)-pregnadiene-3, diones, and the 1-dehydro analogs of the foregoing.

The starting materials thus necessarily possess $\Delta^{9,11}$-bond, and are prepared by a combination of pr esses analogous to those described in the literature. I example, a 17α-hydroxy-21-fluoro-4,9(11)-pregnadie 3,20-dione is conveniently converted to the 17α-acyl( analog upon esterification of the 17α-hydroxypregnadi( according to known techniques such as with acetic a in the presence of trifluoroacetic anhydride or a suita acid anhydride (such as acetic) in the presence of acidic catalyst such as p-toluenesulfonic acid. By s1 stituting other lower alkanoic acids such as β-cyclopent propionic and caproic for acetic acid in the above est( fication procedures, other 17α-lower alkanoate starti compounds are obtained such as the 17α-(β-cyclopent propionate) and 17-caproate respectively.

6α - fluoro - 21-iodo-17α-acetoxy-4,9(11)-pregnadie 3,20 - dione (6α-fluoro-21-iodo-17α-acetoxy-9(11)-del droprogesterone) is prepared from 6α-fluoro-17α,21- hydroxy-4,9(11)-pregnadiene-3,20-dione by conversion the 21-sulfonate ester followed by reaction with sodi iodide and subsequent esterification of the 17-hydro: group in the 6α-fluoro-21-iodo-17α-hydroxy-4,9(1 pregnadiene - 3,20-dione (6α-fluoro-21-iodo-17α-hydro: progesterone) thereby produced.

To obtain 6,17α,21-trisubstituted-9(11)-dehydroprog terones from a 17α-substituted progesterone such as 1' bromoprogesterone, known chemical techniques are e ployed.

An 11α-hydroxyl group, instead of an 11β-hydro: group, may be introduced into a 6,17-disubstituted-desoxyprogesterone through the action of a microorgani such as *Rhizopus nigricans* (A.T.C.C. 6227b) using p cedures analogous to those described in U.S. Patent 1 2,602,769. Subsequent treatment of the 11α-hydro: progesterone derivative so obtained with a sulfonyl ch ride such as methanesulfonyl chloride or toluenesulfo: chloride yields the corresponding 11α-sulfonate wh when treated with a base such as pyridine gives the ( sired 6,17-disubstituted-9(11)-dehydroprogesterone der ative.

In like manner, 6-substituted-17α-bromo-4,9(11)-pr nadiene starting compounds, such as 6α-fluoro-17α-bron 4,9(11) - pregnadiene - 3,20-dione (6α-fluoro-17α-bron 9(11)-dehydroprogesterone) are obtained from 1' bromoprogesterone through the sequence of reactic described in the above paragraphs.

dine is introduced into the 21-position of the 6-substituted-17α-bromo-4,9(11) - pregnadienes described re by known procedures such as, for example, that h utilizes iodine and finely powdered calcium oxide, producing requisite 9(11)-dehydro starting compounds such as for example, 6α-fluoro-17α-bromo-21-iodo-4,9(11)-pregnadiene-3,20-dione (6α-fluoro-17α-bromo-21-iodo-9(11)-dehydroprogesterone).

he 21-fluoro-Δ⁹,¹¹-intermediates are obtained from corresponding 21-iodo analogs by the action of, example, silver fluoride in moist acetonitrile to give uisite intermediates such as 6α,21-difluoro-17α-hydroxy-4,9(11)-pregnadiene-3,20-dione (6α,21 - difluoro-hydroxy-9(11)-dehydroprogesterone), and 6α,21-difluoro-17α-bromo-4,9(11)-pregnadiene-3,20-dione (6α,21-fluoro-17α-bromo-9(11)-dehydroprogesterone). A 6-substituted 21-fluoro-17α-hydroxy intermediate thus produced is easily esterified by previously described procedures to give a corresponding 17α-acyloxy intermediate as 6α,21-difluoro-17α-acetoxy-4,9(11)-pregnadiene-dione (6α,21-difluoro-17α-acetoxy-9(11)-dehydroprogesterone).

he 1-dehydro intermediates, i.e. the 6,21-difluoro-, 6-fluoro-, 21-iodo-, 17α-bromo-1,9(11)-bisdehydroprogesterone, 17α - hydroxy-1,9(11)-bisdehydroprogesterone, 17α-acyloxy-1,9(11)-bisdehydroprogesterone are prepared from the corresponding 1,2-dihydro intermediates microbiological dehydrogenation with an organism as, for example, *Corynebacterium simplex* (A.T.C.C. 6) in a manner similar to that described in U.S. nt No. 2,837,464, or by chemical dehydrogenation ugh the use of such reagents as chloranil or selenium tide.

[H]alogenating agents suitable for use in our process

1) Molecular halogens having a molecular weight ter than 38 and less than 253. This class includes roatomic halogen molecules such as iodine monoride as well as isoatomic halogen molecules such as rine and bromine. The molecular halogen employed may be used alone or in admixture with a halide on. In reactions employing isoatomic molecular gens an anion corresponding to the molecular halois used. For example, in reactions using molecular rine, a suitable chloride salt such as lithium chloride hydrochloric acid are suitable anion sources. In reons which employ a heteroatomic molecular halogen, ource of the more electronegative anion is used, i.e. itable chloride salt or hydrochloric acid is used in a ion employing iodine monochloride.

2) Addition compounds of molecular halogens, said lecular halogens having a molecular weight greater n 38 and less than 253. Examples of such addition pounds are pyridinium bromide perbromide, pyridinichloride perchloride, dioxane dibromide, iodobene dichloride, and the like.

3) N-haloamides in admixture with a halide anion, halogen in the middle being at least as electronegative the halogen cation in the N-haloamide, and the combed molecular weight of said halogens being greater n 38 and less than 253. N-haloamides used in these ctures are such as N-chlorosuccinimide, N-bromoacetide, dimethyl-N,N-dibromohydantoin, N-iodosuccinde and the like. Examples of mixtures of N-halo-ide and a halide are such as N-chlorosuccinimide and lrogen chloride; N-bromoacetamide and hydrogen brole; N-bromoacetamide and lithium chloride; N-bro-acetamide and hydrogen fluoride; N-iodosuccin-de and sodium chloride. These mixtures may have re than one source of halide ion such as in the re-nt combination N-chlorosuccinimide, hydrogen chloe and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as is obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, each of our novel compounds may be prepared by any one of several methods. For example, 6α,21-difluoro-17α-hydroxy-9α,11β - dichloroprogesterone 17-acetate may be prepared from 6α,21-difluoro-17α-hydroxy-9(11)-dehydroprogesterone 17-acetate by utilizing such reagents and combinations as : (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

An alternate route for preparing 6,21-disubstituted-17α-acyloxy compounds falling under the general formula is by halogenating a 6,21-disubstituted-17α-hydroxy-9(11)-dehydroprogesterone (or the 1-dehydro analog) by any of the above described halogenating methods of our invention, with subsequent esterification of the 6,21-disubstituted-9α,11β-dihalogeno-17α-hydroxyprogesterone (or the 1-dehydro analog) thereby obtained. In this manner, 6,21-difluoro-17α-hydroxy-9(11)-dehydroprogesterone, upon chlorination with a reagent such as chlorine in carbon tetrachloride in the presence of pyridine yields 6α,21-difluoro-9α,11β - dichloro-17α-hydroxyprogesterone which when esterified with acetic acid and trifluoroacetic anhydride, for example, gives 6α,21-difluoro-9α,11β-dichloro-17α-hydroxyprogesterone 17-acetate. Other acids may be substituted for acetic acid in the esterification step to obtain the corresponding 17α-acyloxy dihalogenated progesterone.

Our novel halogenating process is also useful in preparing the 1-dehydro compounds falling under the general formula. Thus, a 6,17,21-trisubstituted-9α,11β-dihalogeno-1-dehydroprogesterone falling under the general formula by utilizing any one of the six reagents and combinations listed previously. In addition, our novel halogenated 1-dehydroprogesterones are obtained from the corresponding halogenated progesterones by microbiological or chemical dehydrogenation techniques as heretofore described.

Our process, whereby a 6,17α,21-trisubstituted-9(11)-dehydroprogesterone is converted to a 6,17α,21-trisubstituted-9α,11β-dihalogeno derivative, is generally carried out in the presence of a non-reacting solvent at temperatures ranging from 5° C. to 50° C. with reaction times varying from one-half hour to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethyl sulfoxide, as well as suitable mixtures of these solvents.

Further we have found that when carrying out the halogenation process in a halogenated hydrocarbon solvent such as methylene chloride, chloroform or carbon tetrachloride, the yield and purity of the dihalogenated progesterone obtained is greatly increased by adding pyridine to the reaction mixture. Preferably up to ten equivalents of pyridine are added and usually one to four, based on the amount of steroid being converted. Other organic basic agents which may also be used in conjunction with a halogenated hydrocarbon solvent are aromatic tertiary amines such as lutidine, collidine, alkyl substituted pyridines and the like. The reaction is usually carried out initially at −20° C. with subsequent warming to about room temperature. The reaction time may be as short as five minutes or as long as several hours. In general, the optimum reaction time is about one hour.

Our novel 6,17α,21-trisubstituted dihalogenated progesterones and the 1-dehydro analogs (except those having a free hydroxyl group at C–17) are active progestational agents by both oral and intramuscular routes, being specific in their action and devoid of androgenic, estrogenic or corticoid activity. That our compounds have progestational activity at all is surprising in view of the art which teaches that the introduction of substituents into the C-ring of progesterone and its derivatives, such as for example, 11β-hydroxyprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The 6-substituted-17α-hydroxy-9,11,21-trihalogenated progesterones and their 1-dehydro analogs are valuab as intermediates in the preparation of the 6-substitute 17α-acyloxy-9,11,21-trihalogenated progesterones, whi are active progestins. In addition, the 6-substituted-17 hydroxy-21-fluoro-9,11-dihalogenated progesterones pr duced by our process, and particularly the 1-dehyd analogs, possess anti-inflammatory activity, thus renderii these compounds therapeutically valuable per se.

The following examples are illustrative of the proc dures employed in preparing the compounds of this i vention, but are not to be construed as limiting the sco thereof; the scope of our invention being limited only t the appended claims.

EXAMPLE 1

*6α-methyl-17α-hydroxy-21-iodo-4,9(11)-pregnadiene-3,20-dione*

A. 6α-METHYL-17α,21-DIHYDROXY-4,9(11)-PREGNA-DIENE-3,20-DIONE 21-ACETATE

A solution of 5.0 g. of 6α-methylhydrocortisone aceta in a mixture of 20 ml. of dimethylformamide and 5 m of dry pyridine is chilled in an ice bath and there added dropwise a solution of 3.2 g. of methanesulfon chloride in 30 ml. of dimethylformamide. Stirring continued at room temperature for 28 hours after whic the mixture is poured into ice-water. A precipitate form which is filtered, washed with water and crystallized fro acetone-hexane to give 6α-methyl-17α,21-dihydroxy-4, (11)-pregnadiene-3,20-dione 21-acetate.

B. 6α-METHYL-17α,21-DIHYDROXY-4,9(11)-PREGNA-DIENE-3,20-DIONE

A mixture of 2.0 g. of the pregnadiene of Example 1. and 100 ml. of 0.27 N methanolic perchloric acid is stirre at room temperature for 18 hours. The reaction mi ture is poured into water and the precipitate which forn is filtered and recrystallized from acetone to give 6 methyl-17α,21-dihydroxy-4,9(11)-pregnadiene-3,20-dion C. 6α-METHYL-17α,21-DIHYDROXY-4,9(11)-PREGNA-DIENE-3,20-DIONE 21-METHANESULFONATE A solution of 10 g. of 6α-methyl-17α,21-dihydroxy-4, (11)-pregnadiene-3,20-dione (the compound of Examp 1B) in 200 ml. of dry pyridine is cooled to 0° C. an there is added a solution of 4 ml. of methanesulfon chloride in 20 ml. of chloroform. The mixture is kej at 0° C. for 3 hours, then the excess methanesulfon chloride is decomposed by the addition of a small amoui of ice. The mixture is diluted with chloroform an washed with dilute hydrochloric acid and water. Tl organic solution is dried over magnesium sulfate, filter and evaporated in vacuo to a residue which is crystallize from acetone-ether to give 6α-methyl-17α,21-dihydrox 4,9(11)-pregnadiene-3,20-dione 21-methanesulfonate.

D. 6α-METHYL-17α-HYDROXY-21-IODO-4,9(11)-PREGNA DIENE-3,20-DIONE

A solution of 5 g. of the 21-methanesulfonate of E ample 1C in 50 ml. of acetone containing a few dro of pyridine is warmed slightly and there is added a war solution of 10 g. of sodium iodide in 20 ml. of aceton The mixture is warmed on the steam bath for 5 minute then poured into cold water. A solid separates which filtered, washed with water and crystallized from aceton hexane to give 6α-methyl-17α-hydroxy-21-iodo-4,9(11 pregnadiene-3,20-dione.

EXAMPLE 2

*6α-methyl-17α-hydroxy-21-iodo-4,9(11)-pregnadiene-3,20-dione 17-acetate*

A solution of 1 g. of 6α-methyl-17α-hydroxy-21-iod 4,9(11)-pregnadiene-3,20-dione (the compound of E ample 1) in 20 ml. of acetic acid and 4 ml. of trifluor acetic anhydride is allowed to stand at room temperatui for 16 hours and is then poured into ice water. A sol separates which is filtered, washed with water and cry ed from acetone-hexane to give 6α-methyl-17α-hy-
-21-iodo-4,9(11)-pregnadiene-3,20-dione 17-acetate.
nilarly, by substituting other lower alkanoic acids
as propionic, butyric or valeric for acetic acid in
bove procedure, the corresponding 17-esters are pre-
, i.e. the 17-propionate, 17-butyrate and 17-valerate,
ctively of 6α - methyl-17α-hydroxy-21-iodo-4,9(11)-
ιadiene-3,20-dione.

EXAMPLE 3

*ία-methyl-9α,11β-dichloro-21-iodo-17α-hydroxy-
progesterone 17-acetate*

One gram of 6α-methyl-17α-hydroxy-21-iodo-4,9-
pregnadiene-3,20-dione 17-acetate (the compound of
ιple 2) is dissolved in 30 ml. of carbon tetrachloride
ιich is added at −20° C. a solution of 140 mg. of
ine gas in 3 ml. of carbon tetrachloride and 0.2 ml.
ridine. The mixture is stirred at −20° C. for 15
tes, then allowed to warm to room temperature over
hour period. The solution is filtered and the filtrate
ntrated in vacuo to a residue which upon trituration
ether yields a solid which is crystallized from ace-
hexane to give 6α-methyl-9α,11β-dichloro-21-iodo-
ιydroxyprogesterone 17-acetate.
ernatively, the compound of this example is pre-
according to the following procedures B and C.

B. 6α-METHYL-9α,11β-DICHLORO-21-IODO-17α-
HYDROXYPROGESTERONE the manner described in Example 3A, one gram of
ethyl - 17α - hydroxy-21-iodo-4,9(11)-pregnadiene-
dione (the compound of Example 1) is chlorinated
155 mg. of chlorine gas in carbon tetrachloride in the
nce of 0.2 ml. of pyridine and the resultant product
ed and purified to give 6α-methyl-9α,11β-dichloro-
do-17α-hydroxyprogesterone.

-METHYL-9α,11β-DICHLORO-21-IODO-17α-HYDROXY-
PROGESTERONE 17-ACETATE the manner described in Example 2, the 17α-hydroxy
ogenated progesterone of Example 3B is reacted
acetic acid and trifluoroacetic anhydride and the re-
it product isolated and purified to give 6α-methyl-
11β - dichloro-21-iodo-17α-hydroxyprogesterone 17-
te.
a similar manner, by substituting other lower alka-
acids such as propionic or butyric for acetic acid in
bove procedure, the corresponding 17-esters are pre-
, i.e. 17-propionate and 17-butyrate of 6α-methyl-
β-dichloro-21-iodo-17α-hydroxyprogesterone.

EXAMPLE 4

*methyl-17α-hydroxy-21-fluoro-4,9(11)-pregnadiene-
3,20-dione 17-acetate*

/e grams of 6α-methyl - 17α - hydroxy - 21 - fluoro-
1)-pregnadiene-3,20-dione is reacted with acetic acid
rifluoroacetic anhydride according to the procedure of
ιple 2. The resultant product is isolated in the de-
ed manner and crystallized from acetone-hexane to
6α-methyl - 17α - hydroxy-21-fluoro-4,9(11)-pregna-
-3,20-dione 17-acetate.

EXAMPLE 5

*methyl-17α-hydroxy-21-fluoro-4,9(11)-pregnadiene-
3,20-dione 17-caproate* mixture of 1 g. of 6α-methyl-17α-hydroxy-21-fluoro-
1)-pregnadiene-3,20-dione and 5 ml. of caproic acid
ated at 80° C. in the presence of 1 ml. of trifluoro-
anhydride for 45 minutes. The mixture is poured
ce water and the excess acid neutralized with sodium
nate. The crude reaction mixture is extracted with
ylene chloride. The organic extracts are combined
oncentrated to a residue which is chromatographed
lorisil. The material eluated with 12–35% ether in hexane is combined and crystallized from hexane to give
6α-methyl - 17α - hydroxy-21-fluoro-4,9(11)-pregnadiene-
3,20-dione 17-caproate.

EXAMPLE 6

*6α-methyl-9α,11β-dichloro-21-fluoro-17α-hydroxy-
progesterone 17-acetate*

A. A solution of 1 g. of 6α-methyl-17α-hydroxy-21-
fluoro-4,9(11)-pregnadiene - 3,20 - dione 17-acetate (the
compound of Example 4) and 4 g. of lithium chloride in
50 ml. of glacial acetic acid is cooled to about 10° C. and
there is added 200 mg. of hydrogen chloride in 1 ml. of
tetrahydrofuran followed by 340 mg. of N-chlorosuccin-
imide. The solution is stirred at room temperature for
20 minutes in the absence of light, then is poured into ice
water with stirring. A precipitate forms which is filtered,
washed with water, triturated with ether and crystallized
from acetone-hexane to give 6α-methyl-9α,11β-dichloro-
21-fluoro-17α-hydroxyprogesterone 17-acetate.

Alternatively, the compound of this example is pre-
pared according to the following procedures B and C.

B. 6α-METHYL-9α,11β-DICHLORO-21-FLUORO-17α-
HYDROXYPROGESTERONE

According to the procedure of Example 3B, 6α-methyl-
17α-hydroxy-21-fluoro-4,9(11)-pregnadiene-3,20-dione is
chlorinated with chlorine gas in carbon tetrachloride in
the presence of pyridine and the resultant product isolated
and purified to give 6α-methyl-9α,11β-dichloro-21-fluoro-
17α-hydroxyprogesterone.

C. 6α-METHYL-9α,11β-DICHLORO-21-FLUORO-17α-HY-
DROXYPROGESTERONE 17-ACETATE

The 17α-hydroxyprogesterone of Example 6B is re-
acted with acetic acid and trifluoroacetic anhydride in the
manner described in Example 2 to give 6α-methyl-9α,11β-
dichloro-21-fluoro-17α-hydroxyprogesterone 17-acetate.

In similar manner, by substituting other lower alkanoic
acids such as butyric or propionic for acetic acid in the
above procedure, the corresponding 17-esters are ob-
tained, i.e. the 17-butyrate and 17-propionate of 6α-meth-
yl-9α,11β-dichloro-21-fluoro-17α-hydroxyprogesterone.

Alternatively, the compound of this example is also
prepared according to the following procedure.

D. 6α-METHYL-9α,11β-DICHLORO-21-FLUORO-17α-HY-
DROXYPROGESTERONE 17-ACETATE

One gram of 6α-methyl-17α-hydroxy-21-fluoro-4,9(11)-
pregnadiene-3,20-dione 17-acetate (the compound of Ex-
ample 4) and 790 mg. of p-iodotoluene dichloride are
dissolved in 25 ml. of methylene chloride. The solution
is stirred at room temperature for 5 hours, then concen-
trated in vacuo to a residue which is crystallized from
acetone-hexane to give 6α - methyl-9α,11β-dichloro-21-
fluoro-17α-hydroxyprogesterone 17-acetate.

EXAMPLE 7

*6α-methyl-9α-bromo-11β-chloro-21-fluoro-17α-hydroxy-
progesterone 17-acetate*

A. One gram of 6α - methyl-17α-hydroxy-21-fluoro-
4,9(11)-pregnadiene-3,20-dione 17-acetate (the compound
of Example 4) and 4 g. of lithium chloride are dissolved
in 40 ml. of glacial acetic acid. The solution is cooled
to about 10° C. and there is added 250 mg. of hydrogen
chloride in 1 ml. of tetrahydrofuran followed by 350 mg.
of N-bromoacetamide. The solution is stirred at room
temperature for 20 minutes in the absence of light, then
is poured into ice water with stirring. A precipitate forms
which is filtered, washed with water, triturated with ether
and crystallized from acetone-hexane to give 6α-methyl-
9α - bromo-11β-chloro-21-fluoro-17α-hydroxyprogesterone
17-acetate.

Alternatively, the compound of this example is pre-
pared according to the following procedures B and C.

B. 6α-METHYL-9α-BROMO-11β-CHLORO-21-FLUORO-17α-HYDROXYPROGESTERONE

6α - methyl-17α-hydroxy-21-fluoro-4,9(11)-pregnadiene 3,20-dione is reacted with N-bromoacetamide in the presence of hydrogen chloride and lithium chloride according to the procedure of Example 7A. The resultant product is isolated and purified in the described manner to give 6α - methyl-9α-bromo-11β-chloro-21-fluoro-17α-hydroxyprogesterone.

C. 6α-METHYL-9α-BROMO-11β-CHLORO-21-FLUORO-17α-HYDROXYPROGESTERONE 17-ACETATE

In the manner of Example 2, the 17α-hydroxyprogesterone of Example 7B is reacted with acetic acid and trifluoroacetic anhydride to give 6α-methyl-9α-bromo-11β-chloro-21-fluoro-17α-hydroxyprogesterone 17-acetate.

In a similar manner, by substituting other lower alkanoic acids such as butyric and valeric for acetic acid in the above procedure, the corresponding 17-esters are obtained, i.e. the 17-butyrate and 17-valerate of 6α-methyl - 9α - bromo - 11β - chloro-21-fluoro-17α-hydroxyprogesterone.

EXAMPLE 8

*6α-methyl-9α-bromo-11β,21-difluoro-17α-hydroxyprogesterone 17-acetate*

A. 500 mg. of 6α - methyl - 17α - hydroxy-21-fluoro-4,9(11)-pregnadiene-3,20-dione 17-acetate (the compound of Example 4) is dissolved in 25 ml. of diethylacetic acid and there is added a solution of 600 mg. of hydrogen fluoride in 2.5 ml. of a chloroform-tetrahydrofuran mixture followed by 175 mg. of N-bromoacetamide. The solution is stirred at room temperature for 1½ hours, poured into potassium carbonate solution with vigorous stirring, then is extracted with methylene chloride. The organic extracts are combined, washed with 5% sodium hydroxide in water, dried over magnesium sulfate, filtered and concentrated to a residue which is crystallized from methylene-chloride-hexane to give 6α-methyl-9α-bromo-11β,21-difluoro-17α-hydroxyprogesterone 17-acetate.

Alternatively, the compound of this example is prepared according to the following procedures B and C.

B. 6α-METHYL-9α-BROMO-11β,21-DIFLUORO-17α-HYDROXYPROGESTERONE

6α - methyl-17α - hydroxy-21-fluoro-4,9(11) - pregnadiene-3,20-dione is reacted with N-bromoacetamide and hydrogen fluoride according to the procedure of Example 8A. The resultant product is isolated and purified in the described manner to give 6α-methyl-9α-bromo-11β,21-difluoro-17α-hydroxyprogesterone.

C. 6α-METHYL-9α-BROMO-11β,21-DIFLUORO-17α-HYDROXYPROGESTERONE 17-ACETATE

The 17α-hydroxyprogesterone of Example 8B is esterified by means of acetic acid and trifluoroacetic anhydride in the manner described in Example 2 to give 6α-methyl-9α-bromo - 11β,21-difluoro-17α-hydroxyprogesterone 17-acetate.

EXAMPLE 9

*6α-methyl-9α-iodo-11β-chloro-21-fluoro-17α-hydroxyprogesterone 17-acetate*

A. 500 mg. of 6α-methyl-17α-hydroxy-21-fluoro-4,9-(11)-pregnadiene-3,20-dione 17-acetate (the compound of Example 4) is dissolved in 20 ml. of acetic acid and there is added 285 mg. of N-iodosuccinimide and a solution of 49 mg. of hydrogen chloride in 1.7 ml. of tetrahydrofuran followed by 2 g. of lithium chloride. The mixture is stirred at room temperature for 20 minutes, then poured into water and extracted with methylene chloride. The organic extracts are washed with dilute aqueous sodium bicarbonate solution and then with water. The solution is dried over magnesium sulfate, filtered and concentrated in vacuo to a residue which is triturated with ether and crystallized from acetone-hexane to give 6α-methyl-9α-iodo-11β-chloro-21-fluoro - 17α-hydroxyprogesterone 17-acetate.

Alternatively, the compound of this example is prepared according to the following procedures B and C.

B. 6α-METHYL-9α-IODO-11β-CHLORO-21-FLUORO-17α-HYDROXYPROGESTERONE

6α - methyl - 17α-hydroxy - 21 - fluoro-4,9(11)-pregnadiene-3,20-dione is reacted with N-iodosuccinimide and hydrogen chloride in the presence of lithium chloride according to the procedure of Example 9A. The resultant product is isolated and purified in the described manner to give 6α - methyl - 9α-iodo-11β-chloro-21-fluoro-17α-hydroxyprogesterone.

C. 6α-METHYL-9α-IODO-11β-CHLORO-21-FLUORO-17α-HYDROXYPROGESTERONE 17-ACETATE

The 17α-hydroxyprogesterone of Example 9B is esterified by means of acetic acid and trifluoroacetic anhydride in the manner described in Example 2 to give 6α-methyl-9α - iodo-11β - chloro-21-fluoro-17α-hydroxyprogesterone 17-acetate.

Similarly, by substituting other lower alkanoic acids such as propionic and butyric for acetic acid in the above procedure the corresponding 17-esters are obtained i.e. the 17-propionate and 17-butyrate of 6α-methyl-9-iodo-11β-chloro-21-fluoro-17α-hydroxyprogesterone.

EXAMPLE 10

*6α-methyl-9α,11β-dichloro-21-fluoro-17α-hydroxyprogesterone 17-caproate*

One gram of 6α-methyl-17α-hydroxy-21-fluoro-4,9(11) pregnadiene-3,20-dione 17-caproate (the compound Example 5) is reacted with 300 mg. of N-chlorosuccinimide and 200 mg. of hydrogen chloride in the presence of lithium chloride according to the procedure of Example 6. The resultant product is isolated in the described manner and crystallized from acetone-hexane give 6α - methyl - 9α,11β-dichloro-21-fluoro-17α-hydroxyprogesterone 17-caproate.

EXAMPLE 11

*6α-methyl-9α-bromo-11β,21-difluoro-17α-hydroxyprogesterone 17-caproate*

500 mg. of 6α-methyl-17α-hydroxy-21-fluoro-4,9(11) pregnadiene-3,20-dione 17-caproate (the compound of Example 5) is reacted with 155 mg. of N-bromoacetamide and 600 mg. of hydrogen fluoride in the manner described in Example 8. The resultant product is isolated and purified in the described manner to give 6α-methyl-9α-bromo-11β,21-difluoro-17α-hydroxyprogesterone 17-caproate.

EXAMPLE 12

*6α-17α-dimethyl-4,9(11)-pregnadiene-3,20-dione*

A. 17α-METHYLPROGESTERONE 3,20-BISETHYLENE KETAL

17α-methylprogesterone (30 g.) in 1 liter of dry benzene and 400 ml. of ethylene glycol is refluxed under Dean-Stark separator for 18 hours in the presence 500 mg. of p-toluenesulfonic acid. The reaction mixture is diluted with water and the organic layer separate The benzene solution is washed with 5% aqueous sodium bicarbonate and water, and concentrated to a residue under reduced pressure. Addition of ether to this residue gives a solid which is recrystallized from acetone-ether yielding a product substantially of 17α-methylprogesterone 3-20-bisethylene ketal.

B. 5α,6α-EPOXY-17α-METHYLPREGNANE-3,20-DIONE 3,20-BISETHYLENE KETAL

To a solution of 20 g. of the bisethylene ketal of Example 12A in 320 ml. of chloroform containing 4 drops of pyridine is added with a solution of 14.7 g. of mono perphthalic acid in 200 ml. of ether at 0° C. The mixture is allowed to stand at 0° C. for 24 hours, th ed with ether and washed three times with 5% aque- bicarbonate and twice with water. The solution is l over magnesium sulfate, filtered and the solvent re- ed in vacuo. The resultant residue is chromato- hed on Florisil in hexane. The column is first eluted 20–40% ether in hexane to separate the 5β,6β- ide of 17α-methylpregnane-3,20-dione 3,20-bisethyl- ketal from the desired product. The column is then d with 100% ether and 1% acetone in ether, and eluates concentrated in vacuo to a residue which is allized from acetone-hexane to give 5α,6α-epoxy-17α- ylpregnane-3,20-dione 3,20-bisethylene ketal.

C. 5α-HYDROXY-6β,17α-DIMETHYLPREGNANE- 3,20-DIONE he 5α,6α-epoxy of Example 12B (10 g.) in 200 ml. trahydrofuran and 200 ml. of benzene is added to ignard reagent prepared from 5 g. of magnesium and l. of methyl iodide in 200 ml. of ether. The ether istilled off and the reaction mixture is refluxed 19 hours. The mixture is chilled and an aque- ammonium chloride solution added. The sol- layers are separated and the organic layer washed water and concentrated. The resultant residue is lved in 200 ml. of 90% aqueous methanol, refluxed 3 g. of oxalic acid for 30 minutes, then poured into r. A solid forms which is filtered and crystallized acetone-hexane to give 5α-hydroxy-6β,17α-dimethyl- nane-3,20-dione.

D. 6α,17α-DIMETHYLPROGESTERONE vo grams of 5α-hydroxy-6β,17α-dimethylpregnane- -dione (the compound of Example 12C) in 150 ml. of ol containing 0.5 ml. of concentrated hydrochloric is refluxed for 30 minutes. The solution is then ed into water, the resultant solid filtered, and crystal- from aqueous methanol to give 6α,17α-dimethyl- esterone.

6α,17α-DIMETHYL-11β-HYDROXYPROGESTERONE living culture of the organism *Curvularia lunata* L.R.L. 2380) is rinsed from an agar slant under le conditions into a sterile medium having the fol- ng composition:

| | Percent |
|---|---|
| extract | 5 |
| ose | 1 |
| um nitrate | 0.2 |
| assium chloride | 0.05 |
| nesium sulfate heptahydrate | 0.05 |
| ous sulfate heptahydrate | 0.05 |
| tassium acid phosphate | 0.1 | lled water, adjusted to pH 7.0 with potassium droxide.

0 ml. of this medium is placed in each of several ml. flasks. To each flask is added 50 mg. of 6α,17α- thylprogesterone (the compound of Example 12D) lved in a small volume of acetone. The mixture aken for a period of 7 days at a room temperature bout 28° C. The contents of the flasks are then com- d and extracted with several portions of ethylene di- ride using one-fifth the volume of the aqueous phase time. The combined organic extracts are dried over un sulfate, filtered and concentrated in vacuo to a lue having a volume of 1–2 ml.

he ethylene dichloride residue is then placed on a matographic column consisting of silica gel, mixed a small volume of methylene chloride. The col- is developed with methylene chloride and the eluates combined and concentrated in vacuo to a residue h is crystallized from acetone-hexane to give 6α,17α- thyl-11β-hydroxyprogesterone.

F. 6α,17α-DIMETHYL-4,9(11)-PREGNADIENE- 3,20-DIONE

,17α-dimethyl-11β-hydroxyprogesterone (the com- pound of Example 12E) is reacted with methanesul- fonyl chloride in dimethylformamide-pyridine in the manner described in Example 1A. The resultant prod- uct is isolated and purified in the described manner to give 6α,17α-dimethyl-4,9(11)-pregnadiene-3,20-dione.

EXAMPLE 13

6α,17α-dimethyl-21-iodo-4,9(11)-pregnadiene- 3,20-dione

To a solution of 10 g. of 6α,17α-dimethyl-4,9(11)- pregnadiene-3,20-dione (the compound of Example 12) in 75 ml. of tetrahydrofuran and 40 ml. of methanol is added 17.5 g. of iodine and 17.5 g. of finely powdered calcium oxide. The mixture is stirred at room tempera- ture for 3 hours, then poured into 1.5 l. of cold water containing 60 ml. of acetic acid. The mixture is ex- tracted wtih methylene chloride and the organic extracts are washed with water, dried over magnesium sulfate and filtered. The filtrate is concentrated in vacuo to a residue which is crystallized from methylene chloride- hexane to give 6α,17α-dimethyl-21-iodo-4,9(11)-pregna- diene-3,20-dione.

EXAMPLE 14

6α,17α-dimethyl-9α,11β-dichloro-21-iodoprogesterone

One gram of 6α,17α-dimethyl-21-iodo-4,9(11)-pregna- diene-3,20-dione (the compound of Example 13) is re- acted with 155 mg. of chlorine in carbon tetrachloride in the manner described in Example 3A. The resultant product is isolated in the described manner and crystal- lized from acetone-hexane to give 6α,17α-dimethyl-9α, 11β-dichloro-21-iodoprogesterone.

EXAMPLE 15

6α,17α-dimethyl-21-fluoro-4,9(11)-pregnadiene- 3,20-dione

To 5 g. of 6α,17α-dimethyl-21-iodo-4,9(11)-pregna- diene-3,20-dione (the compound of Example 13) dis- solved in 100 ml. of acetonitrile containing 1 ml. of water, there is added a 50% aqueous solution of 1.4 g. of silver fluoride. The mixture is warmed at 30–40° C. for 4 hours, then filtered. The filtrate is poured into water. A precipitate forms which is filtered and crys- tallized from acetone-hexane to give 6α,17α-dimethyl- 21-fluoro-4,9(11)-pregnadiene-3,20-dione.

EXAMPLE 16

6α,17α-dimethyl-9α,11β-dichloro-21-fluoroprogesterone

One gram of 6α,17α-dimethyl-21-fluoro-4,9(11)-preg- nadiene-3,20-dione (the compound of Example 15) is reacted with 380 mg. of N-chlorosuccinimide in the pres- ence of hydrogen chloride and lithium chloride accord- ing to the procedure of Example 6. The resultant prod- uct is isolated in the described manner and crystallized from acetone-hexane to give 6α,17α-dimethyl-9α,11β- dichloro-21-fluoroprogesterone.

EXAMPLE 17

6α,17α-dimethyl-9α-chloro-11β,21-difluoroprogesterone 500 mg. of 6α,17α-dimethyl-21-fluoro-4,9(11)-pregna- diene-3,20-dione (the compound of Example 15) is dis- solved in 25 ml. of diethylacetic acid and there is added 190 mg. of N-chlorosuccinimide followed by a solution of 775 mg. of hydrogen fluoride in 4 ml. of a mixture of tetrahydrofuran in chloroform. The reaction mixture is stirred at room temperature for 48 hours, then is poured into an aqueous sodium carbonate solution and extracted with methylene chloride. The organic extracts are com- bined and evaporated to a residue which is chromato- graphed on Florisil. The product eluted with 20–40% ether in hexane is combined and recrystallized from methylene chloride-hexane to give 6α,17α-dimethyl-9α- chloro-11β,21-difluoroprogesterone.

EXAMPLE 18

*6α,17α-dimethyl-9α,11β-dibromo-21-fluoroprogesterone*

500 mg. of 6α,17α-dimethyl-21-fluoro-4,9(11)-pregnadiene-3,20-dione (the compound of Example 15) and 2 g. of lithium bromide are dissolved in 25 ml. of acetic acid. 200 mg. of N-bromoacetamide are added followed by a solution of 125 mg. of hydrogen bromide in 2 ml. of acetic acid. The mixture is stirred at room temperature for 1 hour, then poured into ice water. A solid precipitates which is filtered, washed with water and crystallized from methylene chloride-pentane to give 6α,17α - dimethyl - 9α,11β - dibromo - 21 - fluoroprogesterone.

EXAMPLE 19

*6α-methyl-17α-bromo-4,9(11)-pregnadiene-3,20-dione*

A. 17α-BROMOPROGESTERONE 3,20-BISETHYLENE KETAL 30 g. of 17α-bromoprogesterone is reacted with 400 ml. of ethylene glycol in the presence of p-toluenesulfonic acid according to the procedure of Example 12A. The resultant product is isolated in the described manner and crystallized from acetone-ether to give 17α-bromoprogesterone 3,20-bisethylene ketal.

B. 5α,6α-EPOXY-17α-BROMOPREGNANE-3,20-DIONE 3,20-BISETHYLENE KETAL

Five grams of the bisethylene ketal prepared in Example 19A is reacted with monophthalic acid according to the procedure of Example 12B and the resultant product isolated and purified to give 5α,6α-epoxy-17α-bromopregnane-3,20-dione 3,20-bisethylene ketal.

C. 5α-HYDROXY-6β-METHYL-17α-BROMOPREGNANE-3,20-DIONE

Five grams of the 5α,6α-epoxy bisethylene ketal of Example 19B is reacted with methyl magnesium iodide followed by treatment with oxalic acid and the resultant product isolated in the manner described in Example 12C. The isolated product is crystallized from acetone-hexane to give 5α-hydroxy-6β-methyl-17α-bromopregnane-3,20-dione.

D. 6α-METHYL-17α-BROMOPROGESTERONE

Two grams of 5α-hydroxy-6β-methyl-17α-bromopregnane-3,20-dione (the compound of Example 19C) is dissolved in 150 ml. of ethanol containing 0.5 ml. of concentrated hydrochloric acid. The solution is refluxed for 30 minutes, then cooled and poured into water. A solid separates which is filtered and crystallized from aqueous methanol to give 6α-methyl-17α-bromoprogesterone.

E. 6α-METHYL-11β-HYDROXY-17α-BROMOPROGESTERONE

In the manner described in Example 12E, 4 g. of 6α-methyl-17α-bromoprogesterone (the compound of Example 19D) is subjected to the action of a culture of the microorganism *Curvularia lunata* and the resulatnt product isolated and purified to give 6α-methyl-11β-hydroxy-17α-bromoprogesterone.

F. 6α-METHYL-17α-BROMO-4,9(11)-PREGNADIENE-3,20-DIONE

Two grams of 6α-methyl-11β-hydroxy-17α-bromoprogesterone (the compound of Example 19E) is refluxed for 30 minutes with a solution of 4 g. of dry lithium bromide in 50 ml. of glacial acetic acid. The solution is poured into water and the resultant solid is filtered, washed with water and crystallized from acetone-hexane to give 6α-methyl-17α-bromo-4,9(11)-pregnadiene-3,20-dione.

EXAMPLE 20

*6α-methyl-17α-bromo-21-fluoro-4,9(11)-pregnadiene-3,20-dione*

A. 6α-METHYL-17α-BROMO-21-IODO-4,9(11)-PREGNADIENE-3,20-DIONE

Two grams of 6α-methyl-17α-bromo-4,9(11)-pregnadiene-3,20-dione (the compound of Example 19) is reacted with 3 g. of iodine and 3 g. of calcium oxide the manner of Example 13. The resultant product isolated in the described manner and used without furth purification in the following procedure.

B. 6α-METHYL-17α-BROMO-21-FLUORO-4,9(11)-PREGNADIENE-3,20-DIONE

The 21-iodo-4,9(11)-pregnadiene prepared as in E ample 20A is reacted with 630 mg. of silver fluoride the manner of Example 15. The resultant product isolated in the described manner and crystallized fro acetone-hexane to give 6α-methyl-17α-bromo-21-fluor 4,9(11)-pregnadiene-3,20-dione.

EXAMPLE 21

*6α-methyl-9α,11β-dichloro-17α-bromo-21-fluoroprogesterone*

One gram of 6α-methyl-17α-bromo-21-fluoro-4,9(11) pregnadiene-3,20-dione (the compound of Example 20 is reacted with 330 mg. of N-chlorosuccinimide in tl presence of hydrogen chloride and lithium chloride in tl manner of Example 6. The resultant product is isolate in the described manner and crystallized from aceton hexane to give 6α-methyl-9α,11β-dichloro-17α-bromo-2 fluoroprogesterone.

EXAMPLE 22

*6α-methyl-9α,17α-dibromo-11β-chloro-21-fluoroprogesterone*

500 mg. of 6α-methyl-17α-bromo-21-fluoro-4,9(11 pregnadiene-3,20-dione (the compound of Example 20 is reacted with 170 mg. of N-bromoacetamide in the pre ence of hydrogen chloride and lithium chloride in tl manner described in Example 7. The resultant produ is isolated in the described manner and crystallized fro acetone-hexane to give 6α-methyl-9α,17α-dibromo-11 chloro-21-fluoroprogesterone.

EXAMPLE 23

*6α-fluoro-21-iodo-17α-hydroxy-4,9(11)-pregnadiene-3,20-dione*

A. 6α-FLUORO-17α,21-DIHYDROXY-4,9(11)-PREGNADIENE-3,20-DIONE 21-METHANESULFONATE

Ten grams of 6α-fluoro-17α,21-dihydroxy-4,9(11) pregnadiene-3,20-dione is reacted with 4 ml. of methan sulfonyl chloride in the manner described in Example 1( The resultant product is isolated in the described mann and crystallized from acetone-ether to give 6α-fluoro-17 21 - dihydroxy - 4,9(11)-pregnadiene-3,20-dione 21-met anesulfonate.

B. 6α-FLUORO-21-IODO-17α-HYDROXY-4,9(11)-PREGNADIENE-3,20-DIONE

Eight grams of the 21-methanesulfonate of Examp 23A is reacted with sodium iodide in the manner d scribed in Example 1D and the resultant product isolate and purified to give 6α-fluoro-21-iodo-17α-hydroxy- 9(11)-pregnadiene-3,20-dione.

EXAMPLE 24

*6α-fluoro-21-iodo-17α-hydroxy-4,9(11)-pregnadiene-3,20-dione 17-acetate*

1.5 g. of 6α-fluoro-21-iodo-17α-hydroxy-4,9(11)-pre nadiene-3,20-dione (the compound of Example 23) reacted with acetic acid and trifluoroacetic anhydride i the manner described in Example 2. The resultant pro uct is isolated and purified to give 6α-fluoro-21-iodo-17 hydroxy-4,9(11)-pregnadiene-3,20-dione 17-acetate.

EXAMPLE 25

6α-fluoro-9α,11β-dichloro-21-iodo-17α-hydroxyprogesterone 17-acetate

One gram of 6α-fluoro-21-iodo-17α-hydroxy-4,9(11)-pregnadiene-3,20-dione 17-acetate (the compound of example 24) is reacted with 140 mg. of chlorine in carbon tetrachloride in the manner described in Example 3B. The resultant product is isolated in the described manner and crystallized from acetone-hexane to give 6α-fluoro - 9α,11β - dichloro - 21 - iodo - 17α - hydroxyprogesterone 17-acetate.

Alternatively, the compound of this example is prepared according to the following procedures B and C.

B. 6α-FLUORO-9α,11β-DICHLORO-21-IODO-17α-HYDROXYPROGESTERONE

One gram of 6α-fluoro-21-iodo-17α-hydroxy-4,9(11)-pregnadiene-3,20-dione (prepared as in Example 23) is reacted with chlorine in carbon tetrachloride and the resultant product isolated and purified in the manner described in Example 3B to give 6α-fluoro-9α,11β-dichloro-21-iodo-17α-hydroxyprogesterone.

C. 6α-FLUORO-9α,11β-DICHLORO-21-IODO-17α-HYDROXYPROGESTERONE 17-ACETATE

In the manner described in Example 2, the 17α-hydroxyprogesterone of Example 25B is esterified by means of acetic acid and trifluoroacetic anhydride to give 6α-fluoro - 9α,11β - dichloro - 21 - iodo - 17α - hydroxyprogesterone 17-acetate.

In a similar manner, by substituting other lower alkanoic acids such as propionic and butyric for acetic acid in the above procedure the corresponding 17-lower alkanoates are prepared, i.e. the 17-propionate and 17-butyrate, respectively of 6α-fluoro-9α,11β-dichloro-21-iodo-17α-hydroxyprogesterone.

EXAMPLE 26

6α,21-difluoro-17α-hydroxy-4,9(11)-pregnadiene-3,20-dione

Five grams of 6α-fluoro-21-iodo-17α-hydroxy-4,9(11)-pregnadiene-3,20-dione (the compound of Example 23) is reacted with 1.3 g. of silver fluoride and the resultant produce isolated and purified in the manner described in Example 15 to give 6α,21-difluoro-17α-hydroxy-4,9(11)-pregnadiene-3,20-dione.

EXAMPLE 27

6α,21-difluoro-17α-hydroxy-4,9(11)-pregnadiene-3,20-dione 17-acetate

In the manner described in Example 2, the 17α-hydroxypregnadiene of Example 26 is reacted with acetic acid and trifluoroacetic anhydride and the resultant product isolated and purified to give 6α,21-difluoro-17α-hydroxy-4,9(11)-pregnadiene-3,20-dione 17-acetate.

EXAMPLE 28

6α,21-difluoro-17α-hydroxy-4,9(11)-pregnadiene-3,20-dione 17-caproate 5 g. of the 17α-hydroxypregnadiene of Example 26 is esterified by means of caproic acid and trifluoroacetic anhydride in the manner described in Example 5. The resultant product is isolated and purified in the described manner to give 6α,21-difluoro-17α-hydroxy-4,9(11)-pregnadiene-3,20-dione 17-caproate.

In similar manner, by substituting other lower alkanoic acids for caproic acid such as valeric and propionic in the above procedure, the corresponding 17-esters are obtained, i.e. 17-valerate and 17-propionate, respectively, of 6α,21-difluoro-17α-hydroxy-4,9(11)-pregnadiene-3,20-dione.

EXAMPLE 29

6α,21-difluoro-9α,11β-dichloro-17α-hydroxyprogesterone 17-acetate

A. One gram of 6α,21-difluoro-17α-hydroxy-4,9(11)-pregnadiene-3,20-dione 17-acetate (the compound of Example 27) is reacted with 340 mg. of N-chlorosuccinimide in the presence of hydrogen chloride and lithium chloride in the manner described in Example 6. The resultant product is isolated in the described manner and crystallized from acetone-hexane to give 6α,21-difluoro-9α,11β-dichloro-17α-hydroxyprogesterone 17-acetate.

Alternatively, the compound of this example is prepared according to the following procedures B and C.

B. 6α,21-DIFLUORO-9α,11β-DICHLORO-17α-HYDROXYPROGESTERONE

One gram of 6α,21-difluoro-17α-hydroxy-4,9(11)-pregnadiene-3,20-dione (the compound of Example 26) is chlorinated with chlorine gas in carbon tetrachloride in the manner of Example 3B. The resultant product is isolated and purified in the described manner to give 6α,21-difluoro-9α,11β-dichloro-17α-hydroxyprogesterone.

C. 6α,21-DIFLUORO-9α,11β-DICHLORO-17α-HYDROXYPROGESTERONE 17-ACETATE

The 17α-hydroxyprogesterone of Example 29B is esterified by means of acetic acid and trifluoroacetic anhydride in the manner described in Example 2 to give 6α,21-difluoro - 9α,11β-dichloro-17α-hydroxyprogesterone 17-acetate.

Similarly, by substituting other lower alkanoic acids such as propionic and butyric for acetic acid in the above procedure, the corresponding 17-esters are obtained, i.e. the 17-propionate and 17-butyrate of 6α,21-difluoro-9α,11β-dichloro-17α-hydroxyprogesterone.

EXAMPLE 30

6α,11β,21-trifluoro-9α-bromo-17α-hydroxyprogesterone 17-acetate

A. One gram of 6α,21-difluoro-17α-hydroxy-4,9(11)-pregnadiene-3,20-dione 17-acetate (the compound of Example 27) is reacted with 350 mg. of N-bromoacetamide and hydrogen fluoride in the manner described in Example 8A. The resultant product is isolated in the described manner and crystallized from methylene chloride-hexane to give 6α,11β,21-trifluoro-9α-bromo-17α-hydroxyprogesterone 17-acetate.

Alternatively, the compound of this example is prepared according to the following procedures B and C.

B. 6α,11β,21-TRIFLUORO-9α-BROMO-17α-HYDROXYPROGESTERONE

6α,21 - difluoro-17α-hydroxy-4,9(11)-pregnadiene-3,20-dione (the compound of Example 26) is reacted with N-bromoacetamide and hydrogen fluoride in the manner described in Example 8B and the resultant product isolated and purified to give 6α,11β,21-trifluoro-9α-bromo-17α-hydroxyprogesterone.

C. 6α,11β,21-TRIFLUORO-9α-BROMO-17α-HYDROXYPROGESTERONE 17-ACETATE

In the manner described in Example 2, the 17α-hydroxyprogesterone of Example 30B is reacted with acetic acid and trifluoroacetic anhydride and the resultant product isolated and purified to give 6α,11β,21-trifluoro-9α-bromo-17α-hydroxyprogesterone 17-acetate.

In similar manner, by substituting other lower alkanoic acids such as valeric or caproic for acetic acid in the above procedure, the corresponding 17-lower alkanoates are obtained, i.e. the 17-valerate and 17-caproate respectively of 6α,11β,21-trifluoro-9α-bromo-17α-hydroxyprogesterone.

EXAMPLE 31

*6α,-21-difluoro-9α-iodo-11β-chloro-17α-hydroxyprogesterone 17-acetate*

A. 500 mg. of 6α,21-difluoro-17α-hydroxy-4,9(11)-pregnadiene-3,20-dione 17-acetate (the compound of Example 27) is reacted with 280 mg. of N-iodosuccinimide in the presence of hydrogen chloride and lithium chloride in the manner of Example 9A. The resultant product is isolated in the described manner and crystallized from acetone-hexane to give 6α,21-difluoro-9α-iodo-11β-chloro-17α-hydroxyprogesterone 17-acetate.

Alternatively, the compound of this example is prepared according to the following procedures B and C.

B. 6α,21-DIFLUORO-9α-IODO-11β-CHLORO-17α-HYDROXYPROGESTERONE

6α,21 - difluoro-17α-hydroxy-4,9(11)-pregnadiene-3,20-dione (the compound of Example 26) is reacted with N-iodosuccinimide in the presence of hydrogen chloride and lithium chloride in the manner described in Example 9B. The resultant product is isolated and purified in the described manner to give 6α,21-difluoro-9α-iodo-11β-chloro-17α-hydroxyprogesterone.

C. 6α,21-DIFLUORO-9α-IODO-11β-CHLORO-17α-HYDROXYPROGESTERONE 17-ACETATE

In the manner described in Example 2, the 17α-hydroxyprogesterone of Example 31B is esterified by means of acetic acid and trifluoroacetic anhydride to give 6α,21-difluoro-9α-iodo-11β-chloro-17α-hydroxyprogesterone 17-acetate.

In similar manner, by substituting other lower alkanoic acids such as n-butyric and propionic acid for acetic acid in the above procedure, the corresponding 17-lower alkanoates are obtained, i.e. the 17-n-butyrate and 17-propionate of 6α,21-difluoro-9α-iodo-11β-chloro-17α-hydroxyprogesterone.

EXAMPLE 32

*6α,21-difluoro-9α,11β-dichloro-17α-hydroxyprogesterone 17-caproate*

One gram of 6α,21-difluoro-17α-hydroxy-4,9(11)-pregnadiene-3,20-dione 17-caproate (the compound of Example 28) is reacted with 300 mg. of N-chlorosuccinimide in the presence of hydrogen chloride and lithium chloride in the manner described in Example 6. The resultant product is isolated in the described manner and crystallized from ether to give 6α,21-difluoro-9α,11β-dichloro-17α-hydroxyprogesterone 17-caproate.

EXAMPLE 33

*6α-fluoro-21-iodo-17α-methyl-4,9(11)-pregnadiene-3,20-dione*

A. 5α-HYDROXY-6β-FLUORO-17α-METHYLPREGNANE-3,20-DIONE

To 5 g. of 5α,6α-epoxy-17α-methylpregnane-3,20-dione 3,20-bisethylene ketal (the compound of Example 12B) in 100 ml. of methylene chloride is added 5 ml. of 48% hydrofluoric acid. The mixture is stirred for 6 hours, then washed with water and concentrated to a residue. The residue is dissolved in 60 ml. of methanol and refluxed with 2 ml. of 1 N-sulfuric acid for 30 minutes. The solution is diluted with water and extracted with methylene chloride. The extract is washed with water, dried over magnesium sulfate, filtered and evaporated to a residue which is chromatographed on Florisil. The fractions eluated with 60–100% ether in hexane are combined and evaporated to a residue which is crystallized from acetone-hexane to give 5α-hydroxy-6β-fluoro-17α-methylpregnane-3,20-dione.

B. 6α-FLUORO-17α-METHYLPROGESTERONE

Two grams of 5α-hydroxy-6β-fluoro-17α-methylpregnane-3,20-dione (the compound of Example 33A) in 150 ml. of ethanol containing 0.5 ml. of concentrated hydrochloric acid is refluxed for 30 minutes. The solution is then poured into water. The resultant solid is filtered and crystallized from aqueous methanol to give 6α-fluoro-17α-methylprogesterone.

C. 6α-FLUORO-11β-HYDROXY-17α-METHYLPROGESTERONE

6α-fluoro-17α-methylprogesterone (the compound of Example 33B) is subjected to the action of a culture of the microorganism *Curvularia lunata* in the manner described in Example 12E. The resultant product is isolated and purified in the described manner to give 6α-fluoro-11β-hydroxy-17α-methylprogesterone.

D. 6α-FLUORO-17α-METHYL-4,9(11)-PREGNADIENE-3,20-DIONE

In the manner described in Example 1A, 6α-fluoro-11β-hydroxy-17α-methylprogesterone (the compound of Example 33C) is reacted with methane-sulfonyl chloride in dimethylformamide-pyridine and the resultant product isolated and purified to give 6α-fluoro-17α-methyl-4,9(11)-pregnadiene-3,20-dione.

E. 6α-FLUORO-21-IODO-17α-METHYL-4,9(11)-PREGNADIENE-3,20-DIONE

In the manner described in Example 13, 6α-fluoro-17α-methyl-4,9(11)-pregnadiene-3,20-dione (the compound of Example 33D) is reacted with iodine and calcium oxide and the resultant product isolated and purified to give 6α - fluoro-21-iodo-17α-methyl-4,9(11)-pregnadiene-3,20-dione.

EXAMPLE 34

*6α-fluoro-9α,11β-dichloro-21-iodo-17α-methylprogesterone*

In the manner described in Example 3, 1 g. of 6α-fluoro-21-iodo-17α-methyl - 4,9(11) - pregnadiene - 3,20-dione (the compound of Example 33) is reacted with 155 mg. of chlorine gas in carbon tetrachloride and in the presence of pyridine. The resultant product is isolated and purified in the described manner to give 6α-fluoro-9α,11β-dichloro-21-iodo-17α-methyl-progesterone.

EXAMPLE 35

*6α,21-difluoro-17α-methyl-4,9(11)-pregnadiene-3,20-dione*

Five grams of 6α-fluoro-21-iodo-17α-methyl-4,9(11)-pregnadiene-3,20-dione (the compound of Example 33) is reacted with 1.4 g. of silver fluoride in the manner described in Example 15. The resultant product is isolated in the described manner and crystallized from acetone-hexane to give 6α,21-difluoro-17α-methyl-4,9(11)-pregnadiene-3,20-dione.

EXAMPLE 36

*6α,21-difluoro-9α11βdichloro-17α-methylprogesterone*

One gram of 6α21 - difluoro - 17α - methyl - 4,9(11)-pregnadiene-3,20-dione (the compound of Example 35) is reacted with 380 mg. of N-chlorosuccinimide in the presence of hydrogen chloride and lithium chloride according to the procedure described in Example 6. The resultant product is isolated in the described manner and crystallized from acetone-hexane to give 6α,21-difluoro-9α,11β-dichloro-17α-methylprogesterone.

EXAMPLE 37

*6α,21-difluoro-9α-bromo-11β-chloro-17α-methyl-progesterone*

One gram of 6α,21-difluoro-17α-methyl-4,9(11)-pregnadiene-3,20-dione (the compound of Example 35) is reacted with 390 mg. of N-bromacetamide in the presence of hydrogen chloride and lithium chloride in the manner described in Example 7. The resultant product is isolated in the described manner and crystallized from acetone-ether to give 6α,21-difluoro-9α-bromo-11β-chloro-17α-methylprogesterone.

EXAMPLE 38

*6α-fluoro-17α-bromo-4,9(11)-pregnadiene-3,20-dione*

A. 5α-HYDROXY-6β-FLUORO-17α-BROMOPREGNANE-3,20-DIONE

Five grams of 5α,6α-epoxy-17α-bromopregnane-3,20-one, 3,20-bisethylene ketal (the compound of Example B) is reacted with hydrofluoric acid in methylene loride according to the procedure of Example 12C. The resultant product is isolated and purified in the described manner to give 5α-hydroxy-6β-fluoro-17α-bromopregnane-3,20-dione.

B. 6α-FLUORO-17α-BROMOPROGESTERONE

The 5α-hydroxy-6β-fluoropregnane of Example 38A is hydrated with hydrochloric acid in the manner described in Example 12D. The resultant product is isolated in the described manner and crystallized from aqueous methanol to give 6α-fluoro-17α-bromoprogesterone.

C. 6α-FLUORO-17α-BROMO-11β-HYDROXYPROGESTERONE

Three grams of 6α-fluoro-17α-bromoprogesterone (prepared as described in Example 38B) is subjected to the action of a culture of the microorganism *Curvularia lunata* in the manner described in Example 12E. The resultant product is isolated and purified in the described manner to give 6α-fluoro-17α-bromo-11β-hydroxyprogesterone.

D. 6α-FLUORO-17α-BROMO-4,9(11)-PREGNADIENE-3,20-DIONE

6α-fluoro-17α-bromo-11β-hydroxyprogesterone (the compound of Example 38C) is dehydrated with lithium bromide in glacial acetic acid in the manner described in Example 19F. The resultant product is isolated in the described manner and crystallized from acetone-hexane to give 6α-fluoro-17α-bromo-4,9(11)-pregnadiene-3,20-dione.

EXAMPLE 39

*6α,21-difluoro-17α-bromo-4,9(11)-pregnadiene-3,20-dione*

A. 6α-FLUORO-17α-BROMO-21-IODO-4,9(11)-PREGNADIENE-3,20-DIONE

Two grams of 6α-fluoro-17α-bromo-4,9(11)-pregnadiene-3,20-dione (the compound of Example 38) is reacted with iodine and calcium oxide in the manner of Example 3. The resultant product is isolated and purified in the described manner to give 6α-fluoro-17α-bromo-21-iodo-4,9(11)-pregnadiene-3,20-dione.

B. 6α,21-DIFLUORO-17α-BROMO-4,9(11)-PREGNADIENE-3,20-DIONE

The 21-iodopregnadiene of Example 39A is reacted with silver fluoride in the manner described in Example 5. The resultant product is isolated in the described manner and crystallized from acetone-hexane to give 6α,21-difluoro-17α-bromo-4,9(11)-pregnadiene-3,20-dione.

EXAMPLE 40

*6α,21-difluoro-19α,11β-dichloro-17α-bromoprogesterone*

One gram of 6α,21-difluoro-17α-bromo-4,9(11)-pregnadiene-3,20-dione (the compound of Example 39) is reacted with 330 mg. of N-chlorosuccinimide in the presence of hydrogen chloride and lithium chloride according to the procedure of Example 6. The resultant product is isolated in the described manner and crystallized from acetone-hexane to give 6α,21-difluoro-9α,11β-dichloro-17α-bromoprogesterone.

Alternatively, the compound of this example is prepared as follows. One gram of 6α,21-difluoro-17α-bromo-4,9(11)-pregnadiene-3,20-dione (the compound of Example 39) and 785 mg. of p-iodotoluene dichloride are dissolved in 25 ml. of methylene chloride. The solution is stirred at room temperature for 5 hours, then concentrated in vacuo to a residue which is crystallized from acetone-hexane to give 6α,21-difluoro-9α,11β-dichloro-17α-bromo-progesterone.

EXAMPLE 41

*6α-methyl-17α-hydroxy-21-iodo-1,4,9(11)-pregnatriene-3,20-dione*

Five grams of 6α-methyl-17α-hydroxy-21-iodo-4,9(11)-pregnadiene-3,20-dione is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex*. The flask is incubated at 28° C. for 24 hours. A second 300 ml. Erlenmeyer flask containing 150 mg. of sterile 6α-methyl-17α-hydroxy-21-iodo-4,9(11)-pregnadiene-3,20-dione (the compound of Example 1) in 5.0 ml. of acetone is inoculated with the 24-hour culture of *Corynebacterium simplex*. The culture-containing steroid solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α-methyl-17α-hydroxy-21-iodo-1,4,9(11)-pregnatriene-3,20-dione.

Similarly, by subjecting to the action of a culture of the microorganism *Corynebacterium simplex* in the manner described above, the 4,9(11)-pregnadiene intermediates prepared in the above examples are converted to their respective Δ¹-dehydro analogs, namely: 6α-methyl-17α-hydroxy-21-iodo-1,4,9(11)-pregnatriene-3,20-dione 17-acetate, 6α-methyl-17α-hydroxy-21-fluoro-1,4,9(11)-pregnatriene-3,20-dione 17-acetate, 6α-methyl-17α-hydroxy-21-fluoro-1,4,9(11)-pregnatriene-3,20-dione 17-caproate, 6α,17α-dimethyl-1,4,9(11)-pregnatriene-3,20-dione, 6α,17α-dimethyl-21-iodo-1,4,9(11)-pregnatriene-3,20-dione, 16α,17α-dimethyl-21-fluoro-1,4,9(11)-pregnatriene-3,20-dione, 6α-methyl-17α-bromo-1,4,9(11)-pregnatriene-3,20-dione, 6α-methyl-17α-bromo-21-iodo-1,4,9(11)-pregnatriene-3,20-dione, 6α-methyl-17α-bromo-21-fluoro-1,4,9(11)-pregnatriene-3,20-dione, 6α-fluoro-21-iodo-17α-hydroxy-1,4,9(11)-pregnatriene-3,20-dione, 6α-fluoro-21-iodo-17α-hydroxy-1,4,9(11)-pregnatriene-3,20-dione 17-acetate, 6α,21-difluoro-17α-hydroxy-1,4,9(11)-pregnatriene-3,20-dione, 6α,21-difluoro-17α-hydroxy-1,4,9(11)-pregnatriene-3,20-dione 17-acetate, 6α,21-difluoro-17α-hydroxy-1,4,9(11)-pregnatriene-3,20-dione 17-caproate, 6α-fluoro-21-iodo-17α-methyl-1,4,9(11)-pregnatriene-3,20-dione, 6α-21-difluoro-17α-methyl-1,4,9(11)-pregnatriene-3,20-dione, 6α-fluoro-17α-bromo-1,4,9(11)-pregnatriene-3,20-dione, 6α-fluoro-17α-bromo-21-iodo-1,4,9(11)-pregnatriene-3,20-dione, and 6α,21-difluoro-17α-bromo-1,4,9(11)-pregnatriene-3,20-dione, 6α-methyl-17α-hydroxy-21-fluoro-1,4,9(11)-pregnatriene-3,20-dione.

EXAMPLE 42

*6α-methyl-9α,11β-dichloro-21-iodo-17α-hydroxy-1,4-pregnadiene-3,20-dione 17-acetate*

A. 6α-methyl-17α-hydroxy-21-iodo-1,4,9(11)-pregnatriene-3,20-dione 17-acetate (the 1-dehydro analog of the compound of Example 2 prepared according to the procedure of Example 41) is reacted with chlorine in carbon tetrachloride and the resultant product isolated and purified in the manner described in Example 3A to give 6α-methyl-9α,11β-dichloro-21-iodo-17α-hydroxy-1,4-pregnadiene-3,20-dione 17-acetate.

Alternatively, the compound of this example is prepared by the following procedure B.

B. 6α-methyl-9α,11β-dichloro-21-iodo - 17α - hydroxyprogesterone 17-acetate (the compound of Example 3) is subjected to the action of a culture of the microorganism *Corynebacterium simplex* in the manner described in Example 41. The resultant product is isolated and purified in the described manner to give 6α-methyl-9α,11β-dichloro-21-iodo - 17α - hydroxy-1,4-pregnadiene-3,20-dione 17-acetate.

Alternatively, the compound of this example is also prepared according to the following procedures C and D.

C. 6α-METHYL-9α,11β-DICHLORO-21-IODO-17α-HYDROXY-1,4-PREGNADIENE-3,20-DIONE

6α-methyl-17α-hydroxy - 21 - iodo - 1,4,9(11) - pregnatriene-3,20-dione (the compound of Example 41) is chlorinated by means of chlorine gas in carbon tetrachloride and the resultant product isolated and purified in the manner described in Example 3B to give 6α-methyl-9α,11β-dichloro-21-iodo-17α-hydroxy - 1,4 - pregnadiene - 3,20-dione.

Alternatively, the compound of this example is prepared by subjecting 6α-methyl-9α,11β-dichloro-21-iodo-17α-hydroxyprogesterone (the compound of Example 3B) to the action of a culture of *Corynebacterium simplex* as described in Example 41. The resultant product is isolated in the described manner and crystallized from acetone-hexane to give 6α-methyl-9α,11β-dichloro-21-iodo-17α-hydroxy-1,4-pregnadiene-3,20-dione.

D. 6α-METHYL-9α,11β-DICHLORO-21-IODO-17α-HYDROXY-1,4-PREGNADIENE-3,20-DIONE 17-ACETATE

The 17α-hydroxypregnadiene of Example 42C is esterified by means of acetic acid and trifluoroacetic anhydride in the manner described in Example 2 to give 6α-methyl-9α,11β-dichloro-21-iodo-17α-hydroxy - 1,4 - pregnadiene-3,20-dione 17-acetate.

Similarly, by substituting other lower alkanoic acids such as n-butyric and valeric for acetic acid in the above procedure, the corresponding 17-esters are obtained, i.e. the 17-n-butyrate and 17-valerate of 6α-methyl-9α,11β-dichloro-21-iodo-17α-hydroxy - 1,4 - pregnadiene - 3,20-dione.

EXAMPLE 43

*6α-methyl-9α,11β-dichloro-21-fluoro-17α-hydroxy-1,4-pregnadiene-3,20-dione 17-acetate*

A. 6α-methyl-17α-hydroxy - 21 - fluoro-1,4,9(11)-pregnatriene-3,20-dione 17-acetate (the 1-dehydro analog of the compound of Example 4 prepared according to the procedure of Example 41) is chlorinated with N-chlorosuccinimide in the presence of hydrogen chloride and lithium chloride in acetic acid in the manner described in Example 6A. The product is isolated in the described manner and crystallized from acetone-hexane to give 6α-methyl-9α,11β-dichloro-21-fluoro-17α-hydroxy-1,4 - pregnadiene-3,20-dione 17-acetate.

Alternatively, the compound of this example is prepared according to the following procedure B.

B. 6α-methyl-9α,11β-dichloro-21-fluoro-17α - hydroxyprogesterone 17-acetate (the compound of Example 6) is subjected to the action of a culture of *Corynebacterium simplex* in the manner described in Example 41 to give 6α-methyl-9α,11β-dichloro-21-fluoro - 17α - hydroxy-1,4-pregnadiene-3,20-dione 17-acetate.

In similar manner, the compounds of Examples 7 through 11, 25, and 29 through 32 are subjected to the action of *Corynebacterium simplex* to give the corresponding Δ¹-dehydro analogs, i.e. 6α-methyl-9α-bromo-11β-chloro-21-fluoro-17α-hydroxy-1,4-pregnadiene - 3,20-dione 17-acetate, 6α-methyl-9α-bromo - 11β,21 - difluoro-17α-hydroxy-1,4-pregnadiene-3,20 - dione 17 - acetate, 6α-methyl-9α-iodo-11β-chloro-21-fluoro-17α - hydroxy - 1,4-pregnadiene-3,20-dione 17-acetate, 6α-methyl-9α,11β-dichloro-21-fluoro-17α - hydroxy - 1,4 - pregnadiene - 3,20-dione 17-caproate, 6α-methyl-9α-bromo-11β,21 - difluoro-17α-hydroxy-1,4-pregnadiene-3,20-dione 17-caproate, 6α-fluoro-9α,11β-dichloro-21-iodo-17α - hydroxy - 1,4 - pregnadiene-3,20-dione 17-acetate, 6α,21-difluoro-9α,11β-dichloro-17α-hydroxy-1,4-pregnadiene - 3,20 dione 17 - acetate, 6α,11β,21-trifluoro-9α-bromo - 17α - hydroxy - 1,4-pregnadiene-3,20-dione 17-acetate, 6α,21 - difluoro - 9α-iodo-11β-chloro-17α-hydroxy-1,4-pregnadiene-3,20 - dione 17-acetate, and 6α,21-difluoro-9α,11β-dichloro - 17α - hydroxy-1,4-pregnadiene-3,20-dione 17-caproate.

Another method for the preparation of the compound of this example, i.e. 6α-methyl-9α,11β-dichloro-21-fluoro-17α-hydroxy-1,4-pregnadiene-3,20 dione 17-acetate, is described in following procedures C and D.

C. 6α-METHYL-9α,11β-DICHLORO-21-FLUORO-17α-HYDROXY-1,4-PREGNADIENE-3,20-DIONE

6α-methyl-21-fluoro-17α - hydroxy - 1,4,9(11) - pregnatriene-3,20-dione (the Δ¹-dehydro analog of the compound of Example 26 prepared according to the procedure of Example 41) is chlorinated with chlorine in carbon tetrachloride and the resultant product isolated and purified in the manner described in Example 3A to give 6α-methyl-9α,11β-dichloro-21-fluoro-17α - hydroxy - 1,4-pregnadiene-3,20-dione.

Alternatively, this compound is prepared by subjecting 6α-methyl-9α,11β-dichloro-21-fluoro - 17α - hydroxyprogresterone (the compound of Example 29B) to the action of a culture of *Corynebacterium simplex* in the manner described in Example 41.

In like manner, the 17α-hydroxy halogenated progesterones of Examples 7B through 9B, 25B, and 29B through 31B are fermented with *Corynebacterium simplex* to yield respectively, 6α-methyl-9α-bromo-11β-chloro-21-fluoro-17α-hydroxy-1,4-pregnadiene-3,20-dione, 6α methyl-9α-bromo-11β,21-difluoro-17α-hydroxy-1,4 - preg nadiene-3,20 dione, 6α-methyl-9α-iodo-11β - chloro - 21 fluoro-17α-hydroxy-1,4-pregnadiene-3,20 - dione, 6α - fluoro-21-iodo-9α,11β-dichloro-17α - hydroxy - 1,4 - pregnadiene-3,20-dione, 6α,21-difluoro-9α,11β-dichloro-17α - hydroxy-1,4-pregnadiene-3,20-dione, 6α,11β,21-trifluoro-9α bromo 17α-hydroxy-1,4-pregnadiene-3,20 - dione and 6α 21-difluoro-9α-iodo-11β-chloro-17α-hydroxy - 1,4 - pregnadiene-3,20-dione.

D. 6α-METHYL-9α,11β-DICHLORO-21-FLUORO-17α-HYDROXY-1,4-PREGNADIENE-3,20-DIONE 17-ACETATE

The 17α-hydroxy-1,4-pregnadiene of Example 43C i reacted with acetic acid and trifluoroacetic anhydride ii the manner described in Example 2 to give 6α-methyl-9α 11β-dichloro-21-fluoro-17α - hydroxy - 1,4 - pregnadiene 3,20-dione 17-acetate.

Similarly, by substituting other lower alkanoic acid such as propionic and valeric for acetic acid in the abov procedure, the corresponding 17-esters are obtained, i.e the 17-propionate and 17-valerate respectively of 6α methyl-9α,11β-dichloro-21-fluoro-17α-hydroxy-1,4 - preg nadiene-3,20-dione.

Also any of the 17α-hydroxy dihalogenated pregnadi enes obtained as described in above procedure 43C ar esterified with a lower alkanoic acid and trifluoroaceti anhydride in the manner described above to give the cor responding 17-lower alkanoate esters.

EXAMPLE 44

*6α,17α-dimethyl-9α,11β-dichloro-21-iodo-1,4-pregnadiene-3,20-dione*

6α,17α-dimethyl-21-iodo-1,4,9(11)-pregnadiene - 3,20 dione (the Δ¹-dehydro analog of the compound of Ex ample 13 prepared as described in Example 41) is chlc rinated with chlorine gas in carbon tetrachloride in th presence of pyridine in the manner described in Exampl 3A to give 6α,17α-dimethyl-9α,11β-dichloro-21-iodo-1,4 pregnadiene-3,20-dione.

Alternatively, the compound of this example is pro pared by subjecting 6α,17α-dimethyl-9α,11β-dichloro-21 iodoprogesterone (the compound of Example 14) to th action of a culture of *Corynebacterium simplex* in th nner described in Example 41 to give 6α,17α-dimethyl-11β-dichloro-21-iodo-1,4-pregnadiene-3,20-dione.

In similar manner, by the action of a culture of the :roorganism *Corynebacterium simplex*, the compounds Examples 16 through 18, 34, 36 and 37 are converted their Δ¹-dehydro analogs, namely:

17α-dimethyl-9α,11β-dichloro-21-fluoro-1,4-pregna-iiene-3,20-dione,

17α-dimethyl-9α-chloro-11β,21-difluoro-1,4-pregna-iiene-3,20-dione,

17α-dimethyl-9α,11β-dibromo-21-fluoro-1,4-pregna-iiene-3,20-dione,

-fluoro-9α,11β-dichloro-21-iodo-17α-methyl-1,4-pregnadiene-3,20-dione, 21-difluoro-9α,11β-dichloro-17α-methyl-1,4-pregna-iiene-3,20-dione, and 21-difluoro-9α-bromo-11β-chloro-17α-methyl-1,4-pregnadiene-3,20-dione.

EXAMPLE 45

6α - methyl - 9α,11β - dichloro - 17α - bromo - 21-fluoro - 1,4 - pregnadiene - 3,20 - dione 6α - methyl - 17α - bromo - 21 - fluoro - 1,4,9(11)-egnatriene-3,20-dione (prepared from the compound of ample 20 by the procedure of Example 41) is chlori-ted by means of N-chlorosuccinimide, hydrogen chlo-e and lithium chloride in the manner described in ample 6A. The resultant product is isolated in the scribed manner and crystallized from acetone-hexane give 6α-methyl-9α,11β-dichloro-17α-bromo-21-fluoro-1, regnadiene-3,20-dione.

Alternatively, the compound of this example is pre-red by subjecting 6α-methyl-9α,11β-dichloro-17α-bro-)-21-fluoroprogesterone (the compound of Example ) to the action of a culture of *Corynebacterium sim-x* in the manner described in Example 41 to give 6α-thyl - 9α,11β - dichloro - 17α - bromo - 21 - fluoro-4-pregnadiene-3,20-dione.

In similar manner, the Δ¹-dehydro analogs of Examples , 34 through 37 and 40 are prepared by the action of :ulture of *Corynebacterium simplex* to give respectively, -methyl-9α,17α-dibromo-11β-chloro-21-fluoro-1,4-pregnadiene-3,20-dione, -fluoro-9α,11β-dichloro-21-iodo-17α-methyl-1,4-pregnadiene-3,20-dione, ,21-difluoro-9α,11β-dichloro-17α-methyl-1,4-pregna-diene-3,20-dione, ,21-difluoro-9α,bromo-11β-chloro-17α-methyl-1,4-pregnadiene-3,20-dione, and ,21-difluoro-9α,11β-dichloro-17α-bromo-1,4-pregna-diene-3,20-dione.

We claim:

1. A compound selected from the group consisting of pregnenes and the 1-dehydro analogs thereof, said 4-egnenes having the formula:

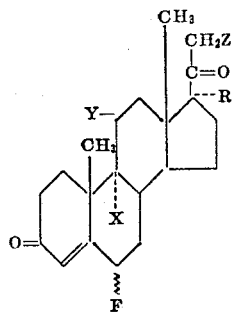

herein X is a halogen having an atomic weight greater an 19; Y is a halogen having an atomic weight less than 26 and being at least as electronegative as X; Z is a member of the group consisting of fluorine and iodine; and R is a member of the group consisting of methyl, bromine, hydroxy and acyloxy radicals of hydrocarbon carboxylic acids containing up to 12 carbon atoms.

2. 9α-X-11β-Y-17α-R-21-Z-6-fluoroprogesterone wherein X is a halogen having an atomic weight greater than 19; Y is a halogen having an atomic weight less than 126 and being at least as electronegative as X; Z is a member of the group consisting of fluorine and iodine; and R is an acyloxy radical of a hydrocarbon carboxylic acid containing up to 12 carbon atoms.

3. 9α-X-11β-Y-17α-R-21-Z-6-fluoro-1 - dehydroproges- terone wherein X is a halogen having an atomic weight greater than 19; Y is a halogen having an atomic weight less than 126 and being at least as electronegative as X; Z is a member of the group consisting of fluorine and iodine; and R is an acyloxy radical of a hydrocarbon carboxylic acid containing up to 12 carbon atoms.

4. 6α-fluoro-9α,11β-dichloro-21 - iodo - 17α - hydroxy-progesterone 17-acetate.

5. 6α-fluoro-9α,11β-dichloro-21-iodo-17α - hydroxy - 1-dehydroprogesterone 17-acetate.

6. 6α,21-difluoro-9α,11β - dichloro - 17α - hydroxypro-gesterone 17-acetate.

7. 6α,21-difluoro-9α,11β-dichloro - 17α - hydroxypro-gesterone 17-caproate.

8. 6α,11β,21-trifluoro-9α-bromo - 17α - hydroxyproges-terone 17-acetate.

9. A compound selected from the group consisting of 6α,21-difluoro-17α-bromo - 9(11) - dehydroprogesterone and the 1-dehydro analog thereof.

10. 9α-X-11β-Y-21-Z-6-fluoro - 17α - bromoprogester-one wherein X is a halogen having an atomic weight greater than 19; Y is a halogen having an atomic weight less than 126 and being at least as electronegative as X; and Z is halogen, of the group consisting of fluorine and iodine.

11. 9α-X-11β-Y-21-Z-6-fluoro-17α - bromo-1-dehydro-progesterone wherein X is a halogen having an atomic weight greater than 19; Y is a halogen having an atomic weight less than 126 and being at least as electronegative as X; and Z is halogen, of the group consisting of fluorine and iodine.

12. 9α-X-11β-Y-21-Z-6 - fluoro - 17α - hydroxyproges-terone wherein X is a halogen having an atomic weight greater than 19; Y is a halogen having an atomic weight less than 126 and being at least as electronegative as X; and Z is halogen, of the group consisting of fluorine and iodine.

13. 9α-X-11β-Y-21-Z-6-fluoro-17α-hydroxy - 1 - dehy-droprogesterone wherein X is a halogen having an atomic weight greater than 19; Y is a halogen having an atomic weight less than 126 and being at least as electronegative as X; and Z is halogen, of the group consisting of fluorine and iodine.

14. 6α-fluoro-9α,11β-dichloro-21-iodo - 17α - hydroxy-progesterone.

15. 6α-fluoro-9α,11β-dichloro-21-iodo-17α-hydroxy - 1-dehydroprogesterone.

16. 6α,21-difluoro-9α,11β-dichloro - 17α - hydroxypro-gesterone.

17. 6α,21-difluoro-9α,11β-dichloro - 17α - hydroxy - 1-dehydroprogesterone.

18. 6α,11β,21-trifluoro-9α-bromo-17α-hydroxy - 1 - de-hydroprogesterone.

19. 6α,21-difluoro-9α,11β-dichloro-17α - bromoproges-terone.

20. 6α,21-difluoro-9α,11β-dichloro-17α-bromo - 1 - de-hydroprogesterone.

References Cited in the file of this patent

UNITED STATES PATENTS

| | | |
|---|---|---|
| 2,838,535 | Magerlein et al. | June 10, 1958 |
| 2,838,537 | Spero et al. | June 10, 1958 |
| 2,867,631 | Lincoln et al. | Jan. 6, 1959 |